United States Patent Office 3,102,850
Patented Sept. 3, 1963

3,102,850
METHOD OF PREPARING A CERAMIC
FUEL ELEMENT
Wilfred T. Ross, Clarence H. Bloomster, and Robert E. Bardsley, Richland, Wash., assignors to the United States of America as represented by the United States Atomic Energy Commission
No Drawing. Filed Nov. 3, 1961, Ser. No. 150,105
2 Claims. (Cl. 204—154.2)

This invention relates to a method for loading a metal tube with different ceramic powders which differ greatly in particle size. In more detail the invention relates to the preparation of a fuel element for a nuclear reactor which contains mixed uranium dioxide and plutonium dioxide powders. Another aspect of the present invention resides in the preparation of nuclear reactor fuel elements having variable enrichment along the length thereof.

A problem arises in mixing two or more oxides when the oxides have different physical characteristics such as widely different particle sizes. It is not possible to prepare a fuel element having a uniform composition from ceramic powders which differ greatly in particle size by standard blending, mixing and loading techniques.

A particular problem arises when the constituents of the fuel element are uranium dioxide and plutonium dioxide. To obtain a high density fuel element fused and crushed uranium dioxide in all sizes passing a 20-mesh screen is employed. Plutonium dioxide is most readily available as calcined oxide which is entirely —325 mesh. Obtaining, measuring and controlling mixtures of these materials is extremely difficult since almost any motion tends to segregate the materials. In addition to the gross difference in particle size, difficulty in mixing results from the high surface activity of plutonium dioxide powder which tends to agglomerate.

It is an object of the present invention to develop a method of loading a metal tube with ceramic powders of widely different particle sizes.

It is a further object of the present invention to develop a method of preparing a mixed uranium dioxide-plutonium dioxide fuel element for a nuclear reactor.

It is also an object of the present invention to develop a method of preparing a ceramic fuel element for a nuclear reactor of variable enrichment along its length.

These and other objects of the present invention are attained by introducing many small increments of a mixture of the ceramic powders into a metal tube to fill the tube and then vibrating the tube to compact the powder. This procedure is then repeated until the tube is completely full.

Surprisingly, segregation apparently does not take place within the tube during vibration when the mixed powders are added to the tube in small increments despite the materials' tendency to segregate during ordinary handling. Attempts to obtain uniform blends of arc-fused $UO_2$ in a range of —20 mesh particle sizes with —325 mesh calcined $PuO_2$ particles were unsuccessful. The range of analyses in the blend alone prior to loading for a batch showed a twenty percent variation from nominal composition.

Further development work was carried out by substituting —325 mesh $UO_2$ for the $PuO_2$; —325 mesh $UO_2$ has similar properties to $PuO_2$ but is far less toxic. Blending techniques were unsuccessful with the arc-fused —20 mesh $UO_2$ particles and —325 mesh $UO_2$ particles. Using one-tube batches, wide variations in the amount of —325 mesh particles along the length of a loaded fuel element were found by screen analysis. Two examples are given below.

Example A

|  | Percent —325 mesh particles in segment | Absolute deviation | Percent deviation from mean composition |
|---|---|---|---|
| Top | 10.9 | −0.5 | −4.4 |
| 2nd | 14.0 | +2.6 | +22.8 |
| 3rd | 12.4 | +1.0 | +8.8 |
| 4th | 13.3 | +1.9 | +16.7 |
| Bottom | 6.3 | −5.1 | −44.8 |
| Mean | 11.4 | | |

Example B

|  | Percent —325 mesh particles in segment | Absolute deviation | Percent deviation from mean composition |
|---|---|---|---|
| Top | 7.0 | −1.2 | −14.6 |
| 2nd | 8.1 | −0.1 | −1.2 |
| 3rd | 10.0 | +1.8 | +21.9 |
| 4th | 11.5 | +3.3 | +40.2 |
| 5th | 9.4 | +1.2 | +14.6 |
| 6th | 8.5 | +0.3 | +3.7 |
| 7th | 7.9 | −0.3 | −3.7 |
| Bottom | 3.5 | −4.7 | −57.3 |
| Mean | 8.2 | | |

The standard deviation in Example A is 24% and the standard deviation in Example B is 27% of the mean compositions.

Using the incremental loading method according to the present invention the variation was reduced considerably. The process was as follows:

(a) The —20 mesh $UO_2$ was screened to remove the —325 mesh particles, leaving coarse particles —20 mesh to +325 mesh.

(b) Using a "Perry Accofil Lab Gun" to obtain uniform increments, a 15 gram increment was taken of the coarse $UO_2$ and a 2.0 gram increment was taken of —325 mesh $UO_2$. The 15 gram and 2 gram increments were mixed together and poured into a tube. The operation was repeated until 100 increments of each were mixed and loaded.

(c) The tube was vibrated 20 seconds on a shaking table to consolidate the particles.

(d) The tube was sectioned into five six-inch long segments. The oxide particles in each segment were screened to determine the variation in —325 mesh particles between segments. The variation was:

|  | Percent —325 mesh particles in segment | Absolute deviation | Percent deviation fromnominal composition |
|---|---|---|---|
| Top | 14.6 | +0.8 | +5.8 |
| 2nd | 13.8 | 0.0 | 0 |
| 3rd | 13.4 | −0.4 | −2.9 |
| 4th | 14.0 | +0.2 | +1.5 |
| Bottom | 13.3 | −0.5 | −3.6 |
| Mean | 13.8 | | |

The over-all percent deviation from nominal composition was reduced to 9.4% from 67% in Example A and 97% in Example B. The standard deviation was 3.3% of the nominal composition as compared to 24% and 27% in Examples A and B.

In preparing a fuel element for actual use rather than testing, the procedure described immediately above is repeated until the tube is completely full. The mixed oxide contained therein is then further compacted as by swaging, the tube is cut to the desired length, and end caps are added.

In preparing fuel elements containing a mixture of plutonium dioxide and uranium dioxide, it is desirable to first blend the −325 mesh plutonium dioxide with a quantity of −325 mesh uranium dioxide which has been removed from the remainder of the uranium dioxide particles as in the above example. This dilutes the plutonium concentration and prevents agglomeration of the highly active plutonium dioxide particles. The blend of −325 mesh plutonium dioxide and uranium dioxide is then mixed with the proper proportion of +325 −20 mesh uranium dioxide to obtain the desired composition and the procedure according to the present invention is followed.

The technique required to achieve a uniform blend of the −325 mesh uranium dioxide with plutonium dioxide is to sprinkle the plutonium dioxide particles uniformly over the surface of the uranium dioxide, then hand mix and finally mechanically mix. The variation in plutonium content in samples from the blend was ±1½%.

One of the more important aspects of the present invention is its use to load a fuel element nonuniformly to achieve uniform power generation. A tube loaded as in the following table will achieve uniform power generation.

| Increment No. | w/o PuO$_2$ in UO$_2$ | g. PuO$_2$ | g. UO$_2$ |
| --- | --- | --- | --- |
| 1 | 1.75 | .29 | 16.9 |
| 2 | 1.60 | .27 | 16.6 |
| 3 | 1.45 | .25 | 16.9 |
| 4 | 1.35 | .23 | 16.9 |
| 5 | 1.25 | .21 | 16.9 |
| 6 | 1.15 | .20 | 16.9 |
| 7 | 1.07 | .18 | 16.9 |
| 8 | 1.00 | .17 | 16.9 |
| 9 | .95 | .16 | 16.9 |
| 10 | .90 | .15 | 16.9 |
| 11 | .85 | .15 | 16.9 |
| 12 | .80 | .14 | 17 |
| 13 | .75 | .13 | 17 |
| 14 | .72 | .12 | 17 |
| 15 | .70 | .12 | 17 |
| 16 | .70 | .12 | 17 |
| 17 | .60 | .10 | 17 |
| 18 | .60 | .10 | 17 |
| 19–22 | .55 | .09 (4 inc.) | 17 |
| 23–41 | .50 | .08 (19 inc.) | 17 |
| 42–44 | .55 | .09 (3 inc.) | 17 |
| 45 | .60 | .10 | 17 |
| 46 | .65 | .10 | 17 |
| 47–49 | .70 | .11 (3 inc.) | 17 |
| 50–51 | .75 | .12 (2 inc.) | 17 |
| 52–53 | .80 | .13 (2 inc.) | 16.9 |
| 54–55 | .85 | .14 (2 inc.) | 16.9 |
| 56 | .90 | .15 | 16.9 |
| 57 | .95 | .16 | 16.9 |
| 58 | 1.00 | .17 | 16.9 |
| 59 | 1.05 | .18 | 16.9 |
| 60 | 1.10 | .19 | 16.9 |
| 61 | 1.15 | .20 | 16.9 |
| 62 | 1.20 | .20 | 16.9 |
| 63 | 1.23 | .21 | 16.9 |

The invention is also useful for preparing elements containing mixtures of plutonium dioxide and thorium dioxide, zirconium dioxide and plutonium dioxide, and uranium dioxide of different enrichments. Also a rare earth oxide can be distributed in the fuel element as a burnable poison in accordance with this invention.

It will be understood that the invention is not to be limited to the details given herein but that it may be modified within the scope of the appended claims.

What is claimed is:

1. A method of preparing a fuel element for a nuclear reactor wherein the fuel is a mixture of −325 mesh PuO$_2$ and −20 mesh UO$_2$ comprising screening out the −325 mesh UO$_2$ from the remainder of the UO$_2$, mixing a small quantity of plutonium dioxide with a quantity of −325 mesh uranium dioxide, blending the said mixture with sufficient of the remaining uranium dioxide to obtain the desired composition, introducing the blend into a metal tube, repeating this procedure a large number of times until the tube is full, vibrating the tube to compact the powder contained therein, repeating the entire procedure as aforesaid until the tube is full and further compacting the powder.

2. A method of preparing a fuel element for a nuclear reactor having a nonuniform composition to attain uniform power generation comprising mixing a small quantity of −325 mesh plutonium dioxide with a quantity of −325 mesh uranium dioxide, blending this mixture with sufficient −20 mesh uranium dioxide to give the desired composition at the end of the fuel element, introducing the blend into a metal tube, repeating this procedure a large number of times, reducing the proportion of plutonium dioxide in the blend until the tube is half full and then increasing the proportion of plutonium dioxide until the tube is full and vibrating the tube to compact the powder contained therein.

References Cited in the file of this patent

UNITED STATES PATENTS

| | | |
| --- | --- | --- |
| 2,548,222 | Kindseth | Apr. 10, 1951 |
| 2,595,262 | Hood | May 6, 1952 |
| 2,834,383 | Williams | May 13, 1958 |
| 3,042,594 | Hauth | July 3, 1962 |

OTHER REFERENCES

Methods and Materials, July 1946, pp. 98–102.

AEC Document, NAA–SR–4155, October 1959, pp. 1–8.